(12) United States Patent
Henry

(10) Patent No.: US 11,130,473 B2
(45) Date of Patent: Sep. 28, 2021

(54) WINDSHIELD SCRUBBING SYSTEM

(71) Applicant: Diana Henry, Coon Rapids, MN (US)

(72) Inventor: Diana Henry, Coon Rapids, MN (US)

( * ) Notice: Subject to any disclaimer, the term of this patent is extended or adjusted under 35 U.S.C. 154(b) by 0 days.

(21) Appl. No.: 16/781,761

(22) Filed: Feb. 4, 2020

(65) Prior Publication Data

US 2021/0237691 A1    Aug. 5, 2021

(51) Int. Cl.
*B60S 1/04* (2006.01)

(52) U.S. Cl.
CPC ............... *B60S 1/0491* (2013.01); *B60S 1/04* (2013.01)

(58) Field of Classification Search
CPC .................................. B60S 1/04; B60S 1/0491
See application file for complete search history.

(56) References Cited

U.S. PATENT DOCUMENTS

| | | | |
|---|---|---|---|
| 2,141,023 A * | 12/1938 | Ryan ...................... | B60S 1/524 15/250.03 |
| 3,021,548 A * | 2/1962 | Stoller ...................... | B60S 1/38 15/250.48 |
| 5,235,720 A | 8/1993 | Kinder | |
| 5,634,841 A | 6/1997 | Gold | |
| 6,070,287 A * | 6/2000 | Kornegay ................. | B60S 1/38 15/247 |
| 6,327,738 B1 * | 12/2001 | Lewis ...................... | B60S 1/38 15/250.001 |
| 7,140,064 B1 | 11/2006 | Woolstenhulme | |
| D586,716 S | 2/2009 | Radfar | |
| 2005/0235448 A1 * | 10/2005 | Richard ................ | B60S 1/0491 15/257.01 |

* cited by examiner

*Primary Examiner* — Michael D Jennings

(57) ABSTRACT

A windshield scrubbing system for scrubbing insects and debris from a windshield includes a windshield wiper is mountable to a wiper arm of a vehicle for wiping across a windshield. A bag is positionable around the windshield wiper to frictionally engage the windshield. Moreover, the bag is comprised of an abrasive material to scrub insects and debris from the windshield. A wiping blade is coupled to the bag to contact the windshield. The wiping blade is comprised of a resiliently compressible material to remove precipitation from the windshield without abrading the windshield.

5 Claims, 4 Drawing Sheets

WINDSHIELD SCRUBBING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to scrubbing device and more particularly pertains to a new scrubbing devices for scrubbing insects and debris from a windshield.

(2) Description of Related Art Including Information Disclosed Under 37 CFR 1.97 and 1.98

The prior art relates to scrubbing devices. The prior art discloses a windshield scrubber that has a notch for receiving a windshield wiper blade. Additionally, the prior art discloses an envelope that can be positioned around a windshield wiper blade for cleaning a windshield. The prior art additionally discloses a windshield wiper blade that has a scrubbing element integrated therein. The prior art discloses an abrasive tube that is positionable around a windshield wiper blade for removing scratches from a windshield. The prior art discloses an envelope that is positionable around a windshield wiper to protect the windshield wiper from sunlight damage.

BRIEF SUMMARY OF THE INVENTION

An embodiment of the disclosure meets the needs presented above by generally comprising a windshield wiper is mountable to a wiper arm of a vehicle for wiping across a windshield. A bag is positionable around the windshield wiper to frictionally engage the windshield. Moreover, the bag is comprised of an abrasive material to scrub insects and debris from the windshield. A wiping blade is coupled to the bag to contact the windshield. The wiping blade is comprised of a resiliently compressible material to remove precipitation from the windshield without abrading the windshield.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
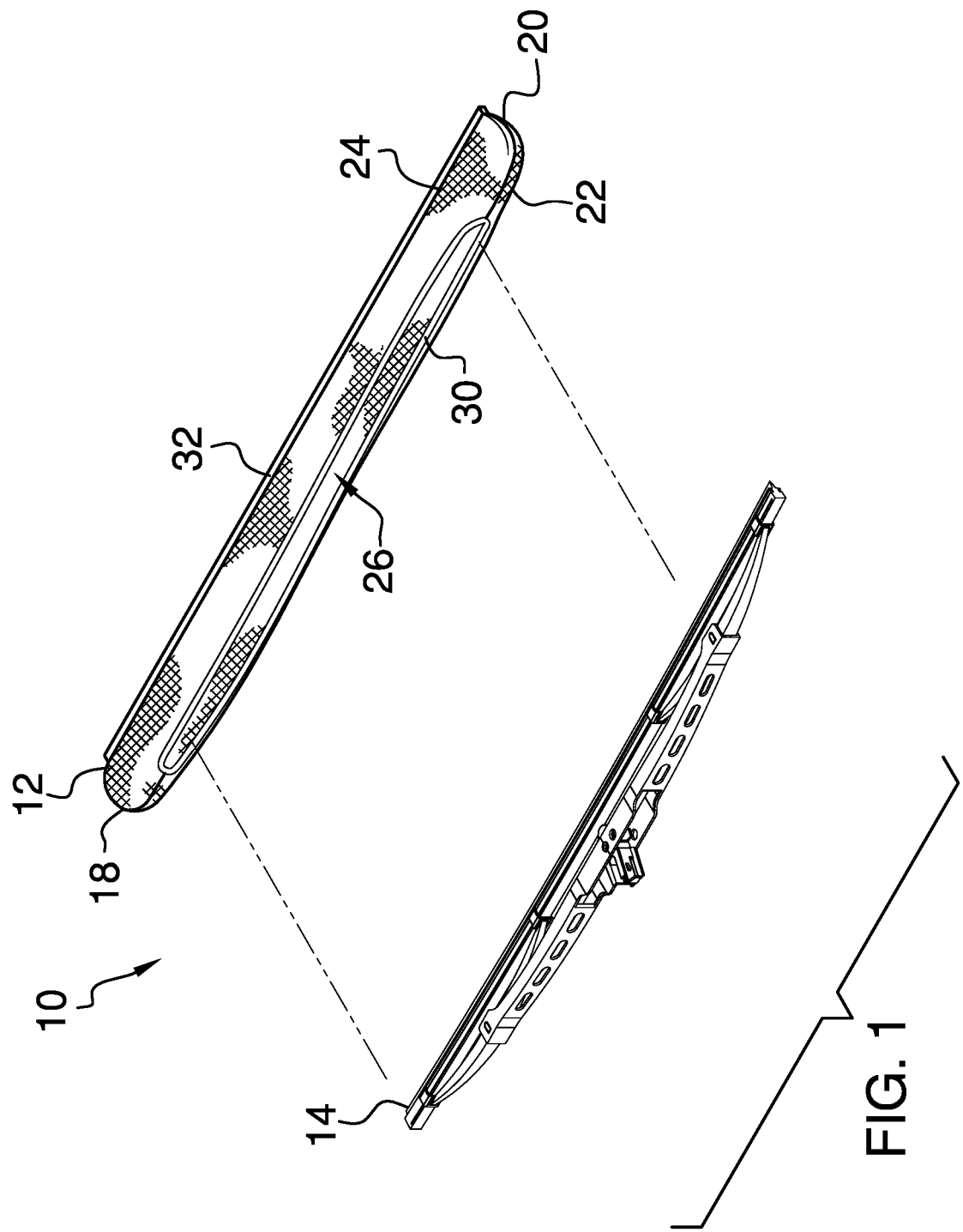
FIG. 1 is an exploded perspective view of a windshield scrubbing system according to an embodiment of the disclosure.
Figure 2:
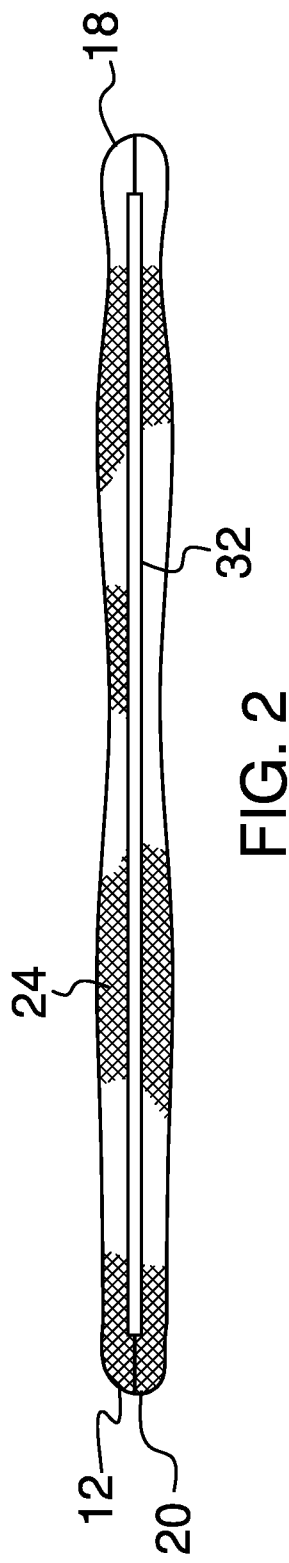
FIG. 2 is a bottom view of a bag of an embodiment of the disclosure.
Figure 3:
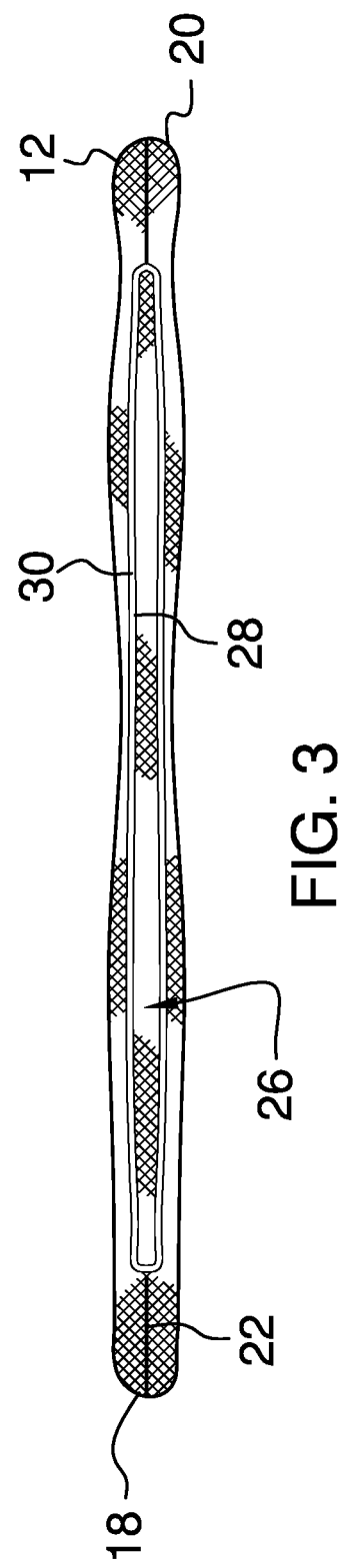
FIG. 3 is a top view of a bag of an embodiment of the disclosure.
Figure 4:
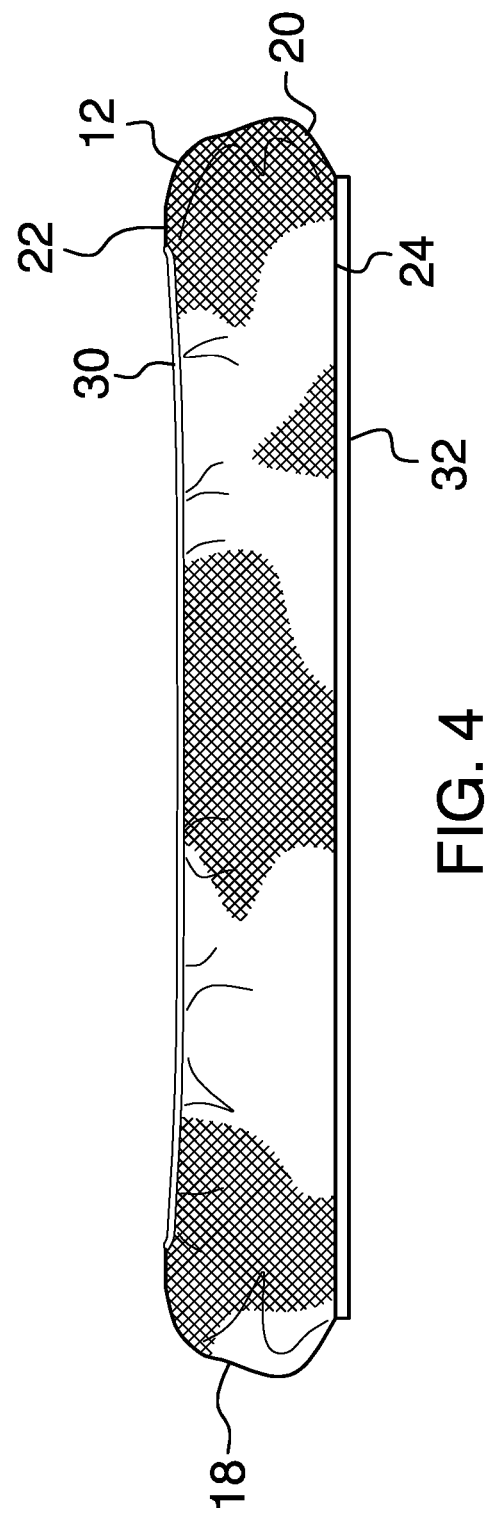
FIG. 4 is a front view of a bag of an embodiment of the disclosure.
Figure 5:
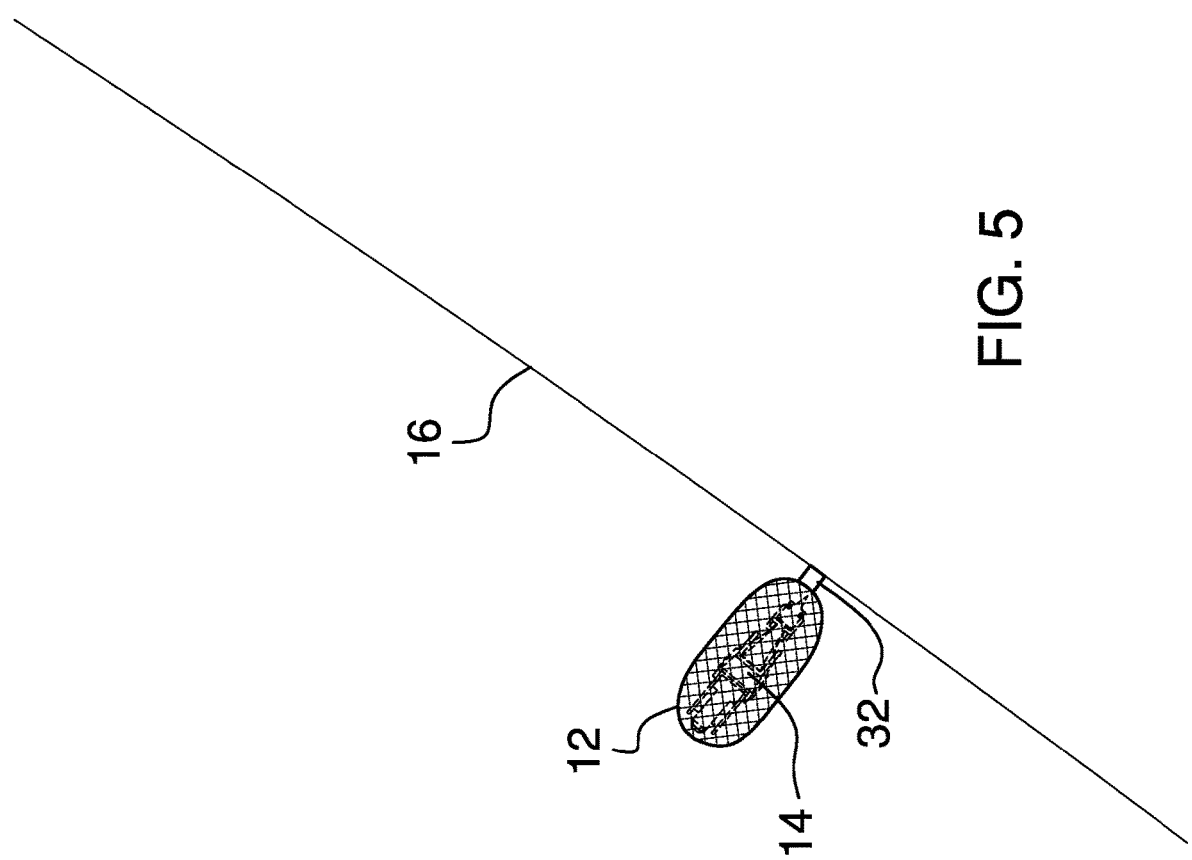
FIG. 5 is a perspective in-use view of an embodiment of the disclosure.

With reference now to the drawings, and in particular to FIGS. 1 through 5 thereof, a new scrubbing device embodying the principles and concepts of an embodiment of the disclosure and generally designated by the reference numeral 10 will be described.

As best illustrated in FIGS. 1 through 5, the windshield scrubbing system 10 generally comprises a bag 12 that is positionable around a windshield wiper 14 of a vehicle. In this way the bag 12 can frictionally engage a windshield 16 of the vehicle. The vehicle may be a passenger vehicle, a cargo vehicle or any other motorized vehicle that includes a windshield and windshield wipers. The bag 12 is comprised of an abrasive material for scrubbing insects and debris from the windshield 16. The abrasive material may comprise a mesh, such as would be found on hand held scrubbers, or other similar material that has sufficient friction to scrub the windshield 16 clean without abrading the windshield 16.

The bag 12 has a first end 18, a second end 20 a top side 22 and a bottom side 24, and the bag 12 is elongated along an axis extending through the first end 18 and the second end 20. The top side 22 has a cut 26 extending into an interior of the bag 12 thereby facilitating the cut 26 to receive the windshield wiper 14 and the cut 26 has a bounding edge 28. An elastomeric band 30 is integrated into the bag 12 and the elastomeric band 30 is coextensive with the bounding edge 28 of the cut 26. The elastomeric band 30 biases the cut 26 to close around the windshield wiper 14 for retaining the bag 12 around the windshield wiper 14.

A wiping blade 32 is coupled to the bag 12 such that the wiping blade 32 contacts the windshield 16. The wiping blade 32 is comprised of a resiliently compressible material to remove precipitation from the windshield 16 without abrading the windshield 16. The wiping blade 32 is positioned on the bottom side 24 of the bag 12 and the wiping blade 32 extends between the first end 18 and the second end 20 of the bag 12. The wiping blade 32 may comprise a strip of rubber or other similar material that would be commonly found on windshield wipers.

In use, the bag 12 is positioned around the windshield wiper 14 such that the wiping blade 32 is positioned against the windshield 16. In this way the bag 12 scrubs insects and other debris from the windshield 16 and the wiper blade wipes moisture from the windshield 16. In this way the windshield 16 can be scrubbed clean of insects and debris without requiring a person to manually scrub the windshield 16. The bag 12 can be removed from the windshield wiper 14 at any time for cleaning or for replacement.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A windshield scrubbing system comprising:
   a windshield wiper being mountable to a wiper arm of a vehicle wherein said windshield wiper is configured to wipe across a windshield, said windshield wiper including a blade that abuts the windshield;
   a bag being positionable around said windshield wiper wherein said bag is configured to frictionally engage the windshield, said bag being comprised of an abrasive material wherein said bag is configured to scrub insects and debris from the windshield;
   a wiping blade being coupled to said bag wherein said wiping blade is configured to contact the windshield, said wiping blade being comprised of a resiliently compressible material wherein said wiping blade is configured to remove precipitation from the windshield without abrading the windshield;
   said bag having a first end, a second end a top side and a bottom side, said bag being elongated along an axis extending through said first end and said second end, said top side has a cut extending into an interior of said bag thereby facilitating said cut to receive the windshield wiper, said cut having a bounding edge;
   said system including an elastomeric band being integrated into said bag, said elastomeric band being coextensive with said bounding edge of said cut, said elastomeric band biasing said cut to close around said windshield wiper for retaining said bag around said windshield wiper; and
   said wiping blade being positioned on said bottom side of said bag, said wiping blade extending between said first end and said second end of said bag.

2. The assembly according to claim 1, wherein said bag has a first end, a second end a top side and a bottom side, said bag being elongated along an axis extending through said first end and said second end, said top side has a cut extending into an interior of said bag thereby facilitating said cut to receive the windshield wiper, said cut having a bounding edge.

3. The system according to claim 2, wherein said wiping blade is positioned on said bottom side of said bag, said wiping blade extending between said first end and said second end of said bag.

4. A windshield scrubbing system comprising:
   a windshield wiper being mountable to a wiper arm of a vehicle wherein said windshield wiper is configured to wipe across a windshield, said windshield wiper including a blade that abuts the windshield;
   a bag being positionable around said windshield wiper wherein said bag is configured to frictionally engage the windshield, said bag being comprised of an abrasive material wherein said bag is configured to scrub insects and debris from the windshield, said bag having a first end, a second end, a top side and a bottom side, said bag being elongated along an axis extending through said first end and said second end, said top side has a cut extending into an interior of said bag thereby facilitating said cut to receive the windshield wiper, said cut having a bounding edge;
   a wiping blade being coupled to said bag wherein said wiping blade is configured to contact the windshield, said wiping blade being comprised of a resiliently compressible material wherein said wiping blade is configured to remove precipitation from the windshield without abrading the windshield; and
   an elastomeric band being integrated into said bag, said elastomeric band being coextensive with said bounding edge of said cut, said elastomeric band biasing said cut to close around said windshield wiper for retaining said bag around said windshield wiper.

5. A windshield scrubbing assembly being configured to be positioned around a windshield wiper of a vehicle for scrubbing insects and debris from the vehicle's windshield, said assembly comprising:
   a bag being positionable around said windshield wiper wherein said bag is configured to frictionally engage the windshield, said bag being comprised of an abrasive material wherein said bag is configured to scrub insects and debris from the windshield, said bag has a first end, a second end a top side and a bottom side, said bag being elongated along an axis extending through said first end and said second end, said top side has a cut extending into an interior of said bag thereby facilitating said cut to receive the windshield wiper, said cut having a bounding edge;
   an elastomeric band being integrated into said bag, said elastomeric band being coextensive with said bounding edge of said cut, said elastomeric band biasing said cut to close around said windshield wiper for retaining said bag around said windshield wiper; and
   a wiping blade being coupled to said bag wherein said wiping blade is configured to contact the windshield, said wiping blade being comprised of a resiliently compressible material wherein said wiping blade is configured to remove precipitation from the windshield without abrading the windshield, said wiping blade is positioned on said bottom side of said bag, said wiping blade extending between said first end and said second end of said bag.

\* \* \* \* \*